(12) United States Patent
Tvrdy (10) Patent No.: US 8,944,444 B1
(45) Date of Patent: Feb. 3, 2015

(54) VERTICAL TOOL BOX

(71) Applicant: Patrick G. Tvrdy, Ceresco, NE (US)

(72) Inventor: Patrick G. Tvrdy, Ceresco, NE (US)

( * ) Notice: Subject to any disclaimer, the term of this patent is extended or adjusted under 35 U.S.C. 154(b) by 0 days.

(21) Appl. No.: 14/139,139

(22) Filed: Dec. 23, 2013

(51) Int. Cl.
*B62B 1/12* (2006.01)
*B62B 3/00* (2006.01)

(52) U.S. Cl.
CPC ..................... *B62B 3/005* (2013.01)
USPC ......... 280/79.2; 280/47.35; 312/286

(58) Field of Classification Search
CPC .... B62B 3/002; B62B 3/005; B62B 2202/48; A47B 2088/0485; A47B 2088/0403
USPC ........................ 280/47.35; 312/286
See application file for complete search history.

(56) References Cited

U.S. PATENT DOCUMENTS

| | | | | |
|---|---|---|---|---|
| 2,923,584 A * | 2/1960 | Broderick, Jr. | ............ | 312/317.1 |
| 3,520,583 A * | 7/1970 | Case | ............... | 312/277 |
| 4,733,703 A * | 3/1988 | Cimino | ......... | 144/285 |
| 4,976,450 A * | 12/1990 | Ellefson | ....... | 280/79.11 |
| 5,244,265 A * | 9/1993 | Chiang | .......... | 312/107 |
| 5,257,860 A * | 11/1993 | Slivon | .......... | 312/218 |
| 5,378,005 A * | 1/1995 | Norton | ........... | 280/47.26 |
| 5,443,311 A * | 8/1995 | Kadlecek et al. | ........... | 312/308 |
| 5,468,063 A * | 11/1995 | Simonek | ........... | 312/334.28 |
| 5,588,659 A * | 12/1996 | Boes et al. | .......... | 280/47.19 |
| 5,590,940 A * | 1/1997 | Richard | .......... | 312/287 |
| 5,634,649 A * | 6/1997 | Breining et al. | .......... | 280/47.35 |
| 6,374,649 B1 * | 4/2002 | Holcomb et al. | ........... | 70/78 |
| 7,665,809 B1 * | 2/2010 | Giles et al. | .......... | 312/204 |
| D636,599 S * | 4/2011 | Hsu | ............... | D3/297 |
| 7,963,533 B2 * | 6/2011 | Bothun et al. | ......... | 280/47.35 |
| 8,157,337 B2 * | 4/2012 | Manalang et al. | .......... | 312/249.8 |
| 8,162,330 B2 * | 4/2012 | Melkumyan et al. | ...... | 280/47.34 |
| 8,322,732 B2 * | 12/2012 | McKay et al. | .......... | 280/47.35 |
| 8,360,446 B1 * | 1/2013 | Hertan | .......... | 280/47.35 |
| 8,360,538 B2 * | 1/2013 | Retchloff | .......... | 312/352 |
| 8,668,209 B1 * | 3/2014 | Anzivino et al. | .......... | 280/47.12 |
| 2001/0028208 A1* | 10/2001 | Reilly | .......... | 312/286 |
| 2002/0130598 A1* | 9/2002 | Schmidt | .......... | 312/324 |
| 2007/0013280 A1* | 1/2007 | Retchloff | .......... | 312/319.8 |

* cited by examiner

*Primary Examiner* — Jeffrey J Restifo
(74) *Attorney, Agent, or Firm* — Dennis L. Thomte; Thomte Patent Law Office LLC (57) ABSTRACT

A vertical tool box including a vertically disposed frame having a pocket between the front and rear sides thereof. A first tool support panel is positioned in said pocket and is selectively horizontally slidably movable between stowed and tool presentation positions. A second tool support panel is also positioned in said pocket and is selectively horizontally slidably movable between stowed and tool presentation positions. When the first and second tool support panels are in their tool presentation positions, the first tool support panel is positioned laterally of one side of the frame and the second tool support panel is positioned laterally of the other side of the frame.

11 Claims, 11 Drawing Sheets

VERTICAL TOOL BOX

BACKGROUND OF THE INVENTION

1. Field of the Invention

This invention relates to a vertical tool box and more particularly to a vertical tool box which has first and second vertically disposed tool support panels which are selectively horizontally slidably mounted on the main frame of the tool box.

2. Description of the Related Art

Many types of tool boxes or tool chests have been previously provided. The most common type of tool box or tool chest is a wheeled cabinet having a plurality of horizontally disposed and vertically spaced drawers which may be slidably pulled outwardly from the front of the cabinet. Other tool boxes or tool chests have been provided wherein vertically disposed drawers may be individually pulled upwardly from a cabinet.

There exists a need for a tool box which is movable from one location to another and which is convenient to use. There also exists the need for a portable tool box which has a large tool supporting capacity and which is stable in use.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A vertical tool box is disclosed which includes a vertically disposed wheeled frame means having a lower end, an upper end, a first side, a second side, a front side and a rear side. The front and rear sides of the vertically disposed wheeled frame means are horizontally spaced-apart to define a pocket therebetween. The front side of the wheeled frame means has tool supporting fixtures thereon. A vertically disposed first tool support panel is provided which has a lower end, an upper end, a first side edge, and a second side edge. The first tool support panel is selectively horizontally slidably mounted on the wheeled frame means between stowed and tool presentation positions. The first tool support panel, when in its stowed position, is centrally positioned in the pocket rearwardly of the front side of the wheeled frame means. The first tool support panel, when in its tool presentation position, is positioned horizontally laterally of the first side of the wheeled frame means.

The tool box also includes a vertically disposed second tool support panel which has a lower end, an upper end, a first side edge, and a second side edge. The second tool support panel is selectively horizontally slidably mounted on the wheeled frame means between stowed and tool presentation positions. The second tool support panel, when its stowed position, is centrally positioned in the pocket forwardly of the first tool support panel when the first tool support panel is in its stowed position. The second tool support panel, when in its tool presentation position, is positioned horizontally laterally of the second side of the wheeled frame means.

In the preferred embodiment, each of the first and second tool support panels has a peg board associated therewith upon which tools may be positioned. In the preferred embodiment, the tool supporting fixtures on the front side of the wheeled frame means comprise horizontally extending and vertically spaced-apart shelves. In the preferred embodiment, a vertically disposed peg board is secured to the rear side of the wheeled frame means for supporting tools thereon.

It is therefore a principal object of the invention to provide an improved tool box.

A further object of the invention is to provide an improved tool box wherein first and second tool support panels are horizontally slidably mounted on a wheeled frame means with one of the tool support panels being selectively movable to one side of the wheeled frame means and with the other tool support panel being selectively movable to the other side of the wheeled frame means.

A further object of the invention is to provide a vertical tool box which is stable in use and which will not overturn.

A further object of the invention is to provide a vertical tool box of the type described which enables an enormous amount of tools to be supported thereon and therein.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
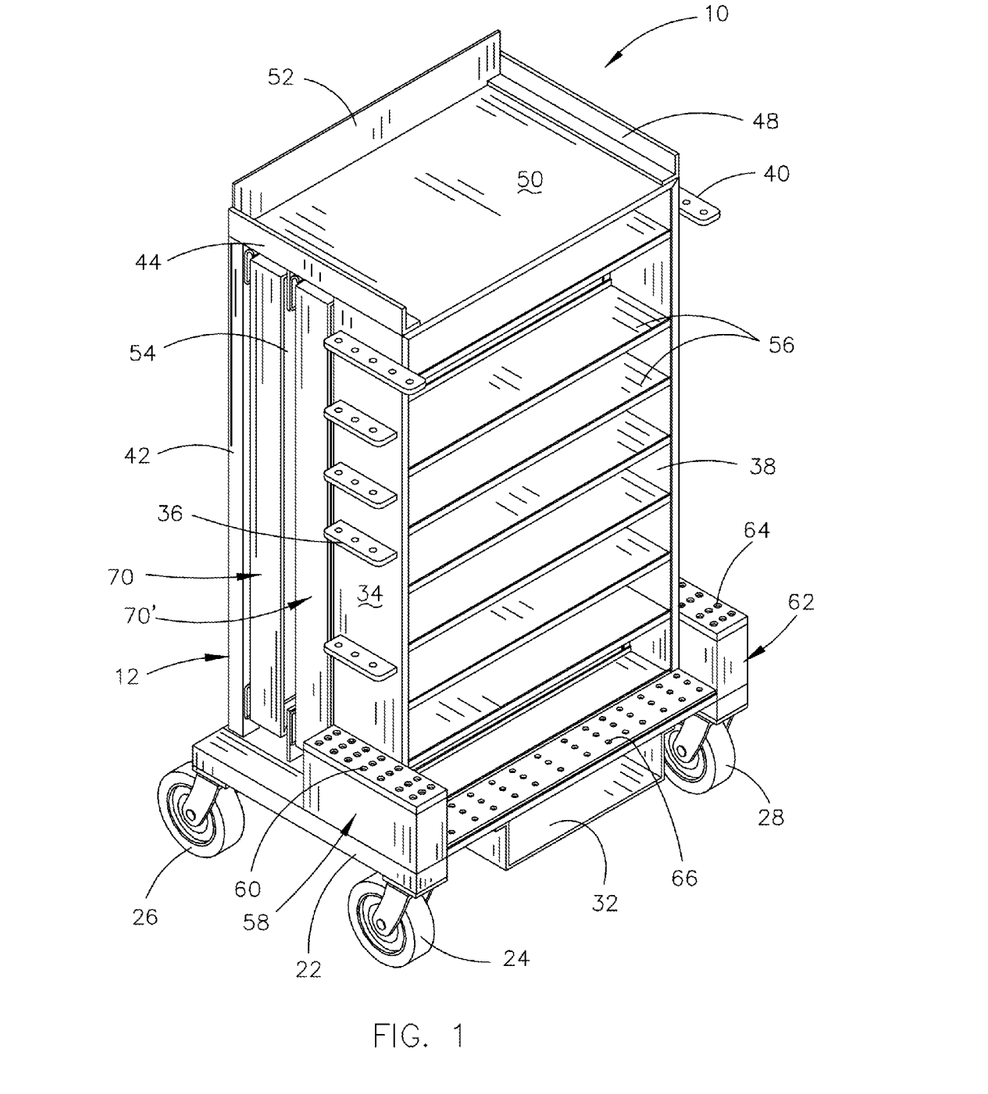
FIG. 1 is a left front perspective view of the vertical tool box of this invention.
Figure 5:
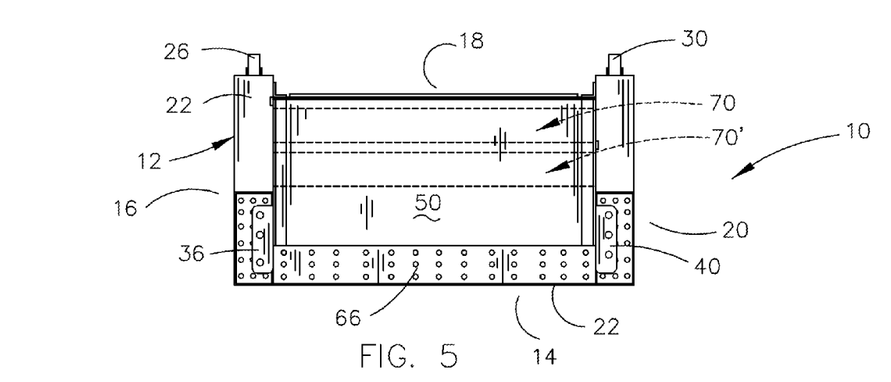
FIG. 5 is a top view of the tool box of this invention.
Figure 6:
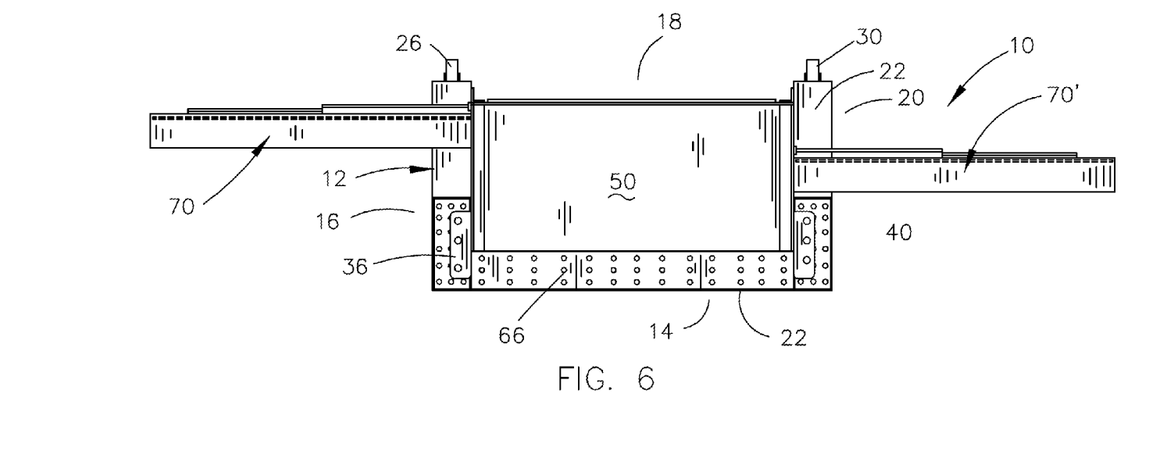
FIG. 6 is a view similar to FIG. 5 except that the first and second tool support panels are in their extended tool presentation positions.
Figure 7:
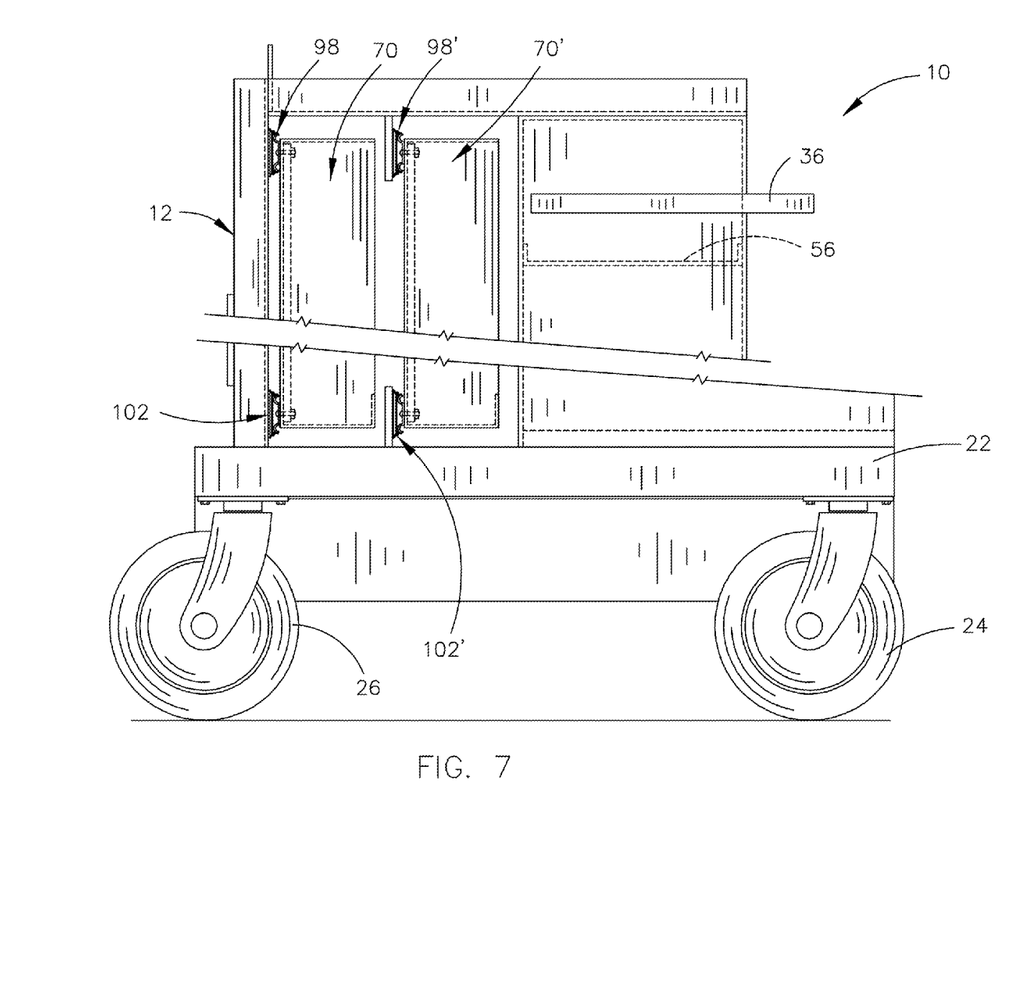
FIG. 7 is a partial side elevational view of the vertical tool box of this invention.
Figure 8:
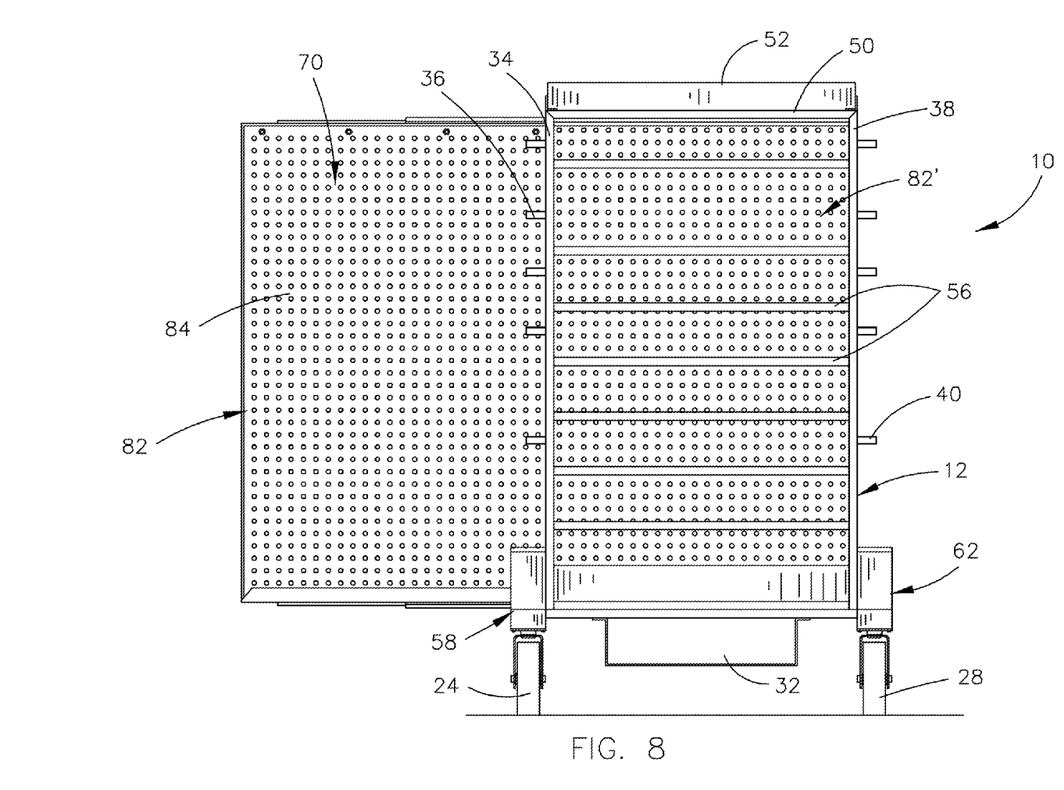
FIG. 8 is a front view of the vertical tool box of this invention with one of the tool support panels being positioned in the tool presentation position.
Figure 9:
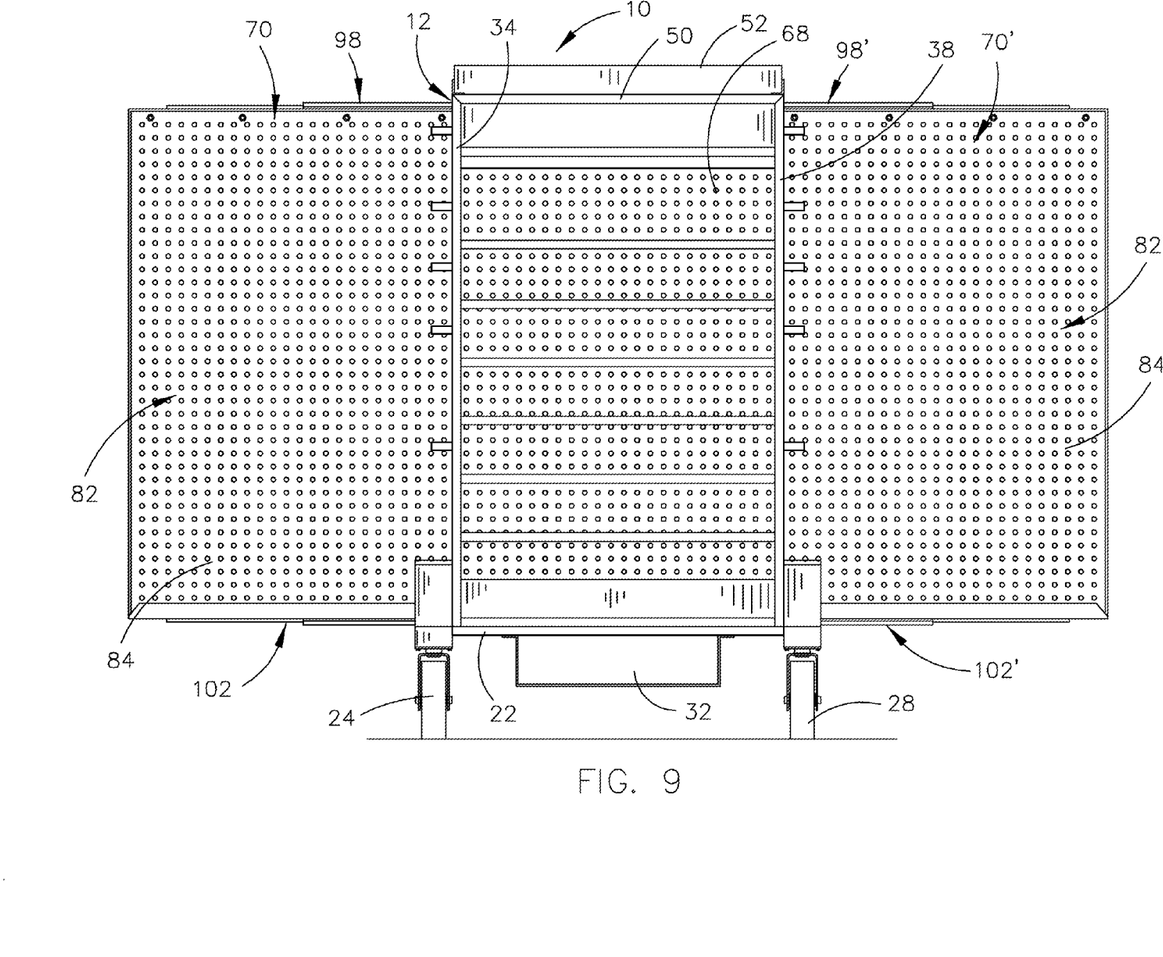
FIG. 9 is a view similar to FIG. 8 except that both of the tool support panels have been moved to their tool presentation positions.

The vertical tool box of this invention is referred to by the reference numeral 10. Tool box 10 includes a vertical disposed frame 12 having a front side 14, a left side 16, a rear side 18 and a right side 20 (FIGS. 5 and 6). Frame 12 includes a horizontally disposed base 22 supported by caster wheels 24, 26, 28 and 30. A storage bin 32 is secured to the underside of base 22 and has an open front end. Frame 12 includes a vertically disposed left front side frame member 34 which has its lower end secured to base 22. A plurality of vertically spaced tool supports 36 are secured to the outer side of frame member 34 as seen in FIG. 1. Frame 12 also includes a vertically disposed right front side frame member 38 which is secured to base 22. The outer side of frame member 38 has a plurality of tool supports 40 secured thereto.

Figure 2:
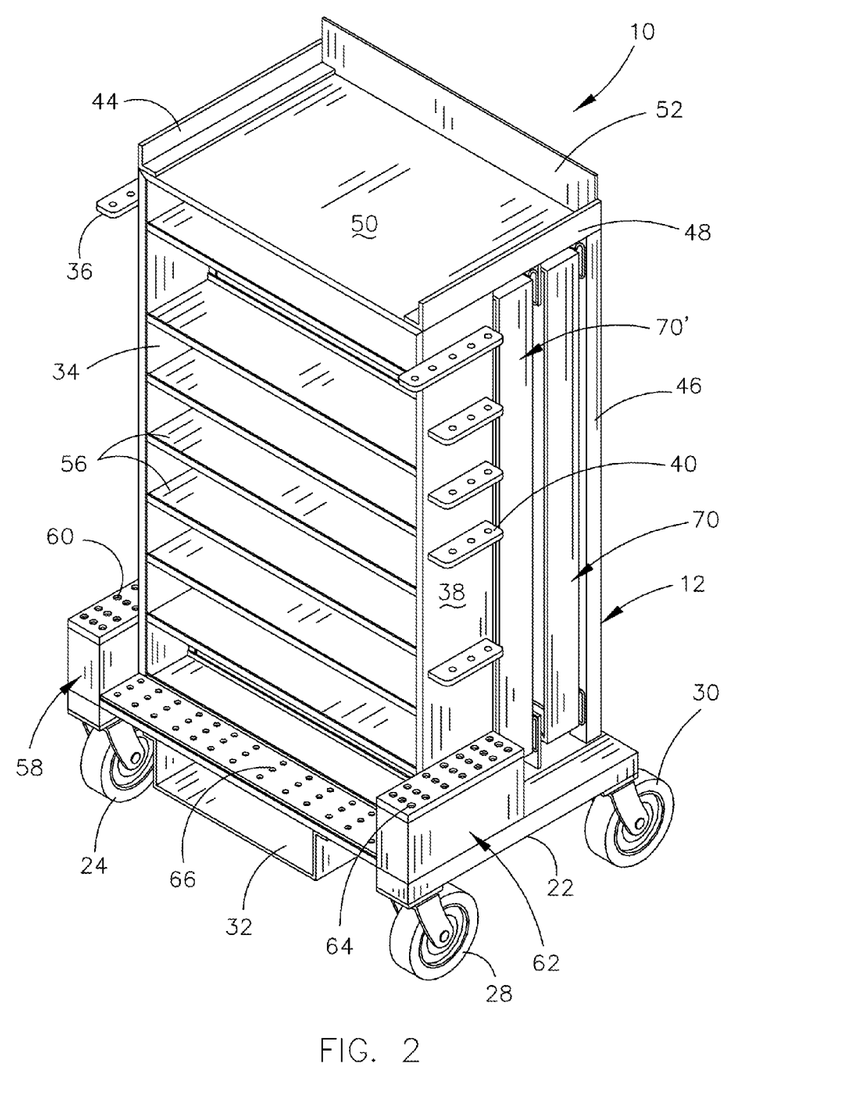
FIG. 2 is a right front perspective view of the vertical tool box of this invention.
Figure 3:
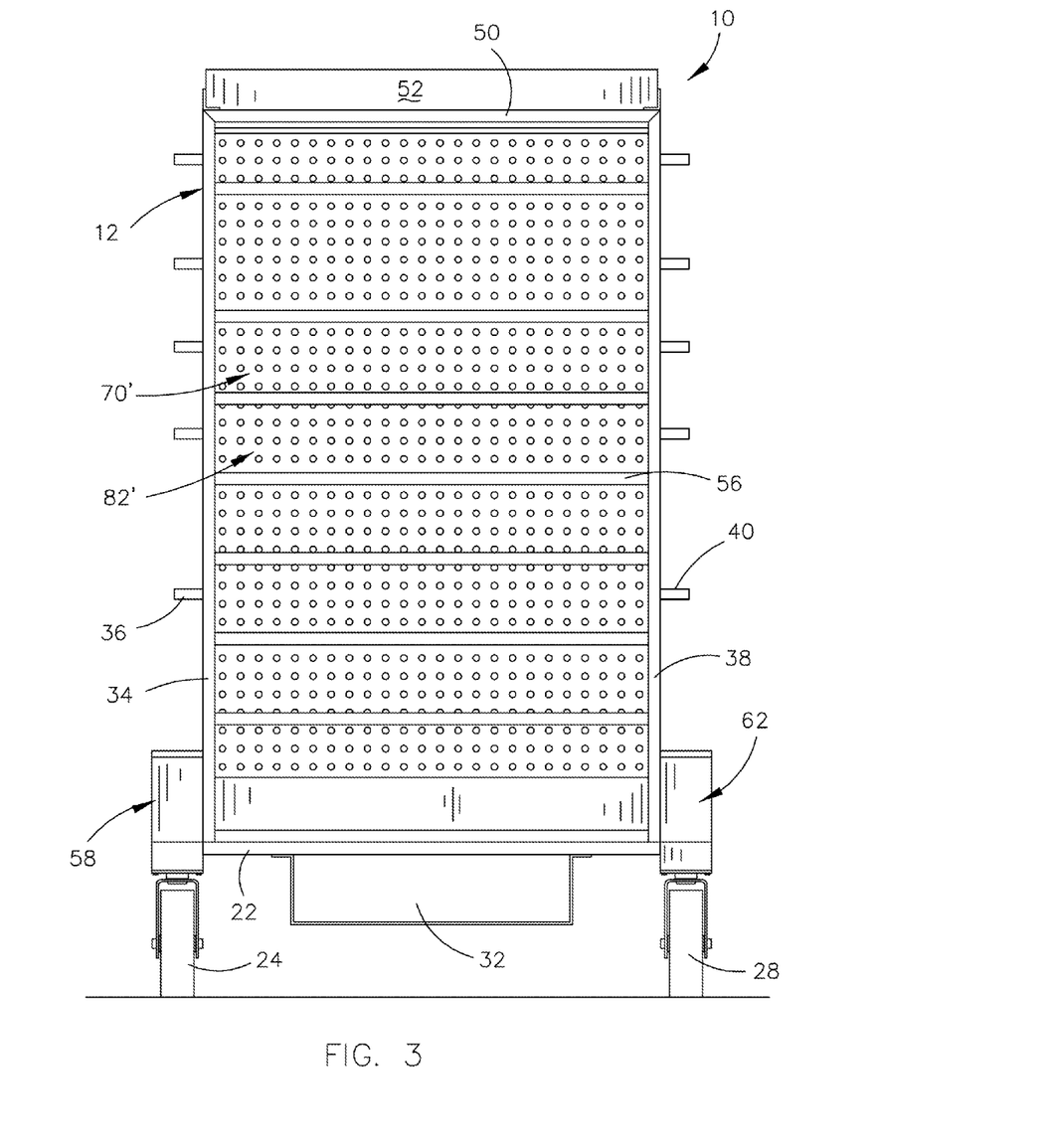
FIG. 3 is a front view of the vertical tool box of this invention.
Figure 4:
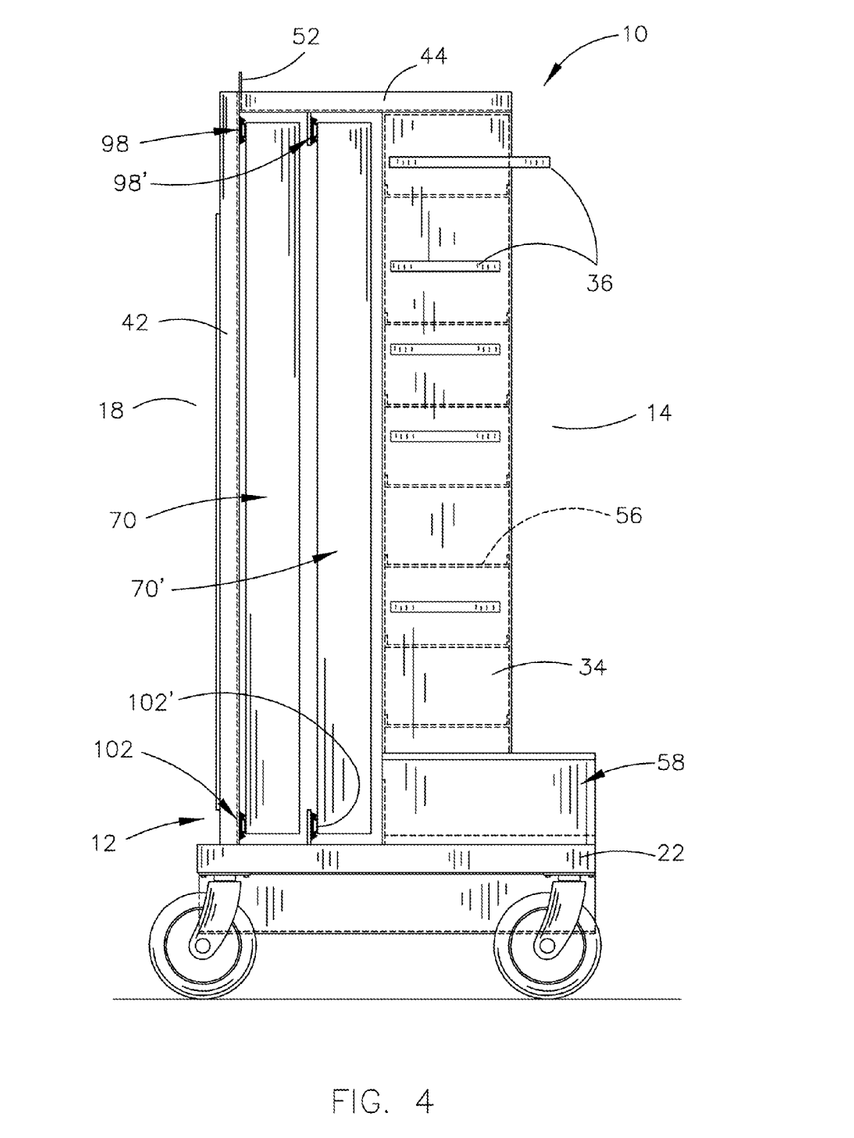
FIG. 4 is a left elevational view of the tool box of this invention.

Frame 12 further includes a vertically disposed left rear frame member 42, the lower end of which is secured to base 22 rearwardly of frame member 34. A horizontally disposed frame member 44 is secured to the upper ends of frame members 34 and 42 and extends therebetween. Frame 12 additionally includes a vertically disposed right rear frame member 46, the lower end of which is secured to base 22. A horizontally disposed frame member 48 is secured to and extends between the upper ends of frame members 38 and 46. As seen in FIGS. 1 and 2, a horizontally disposed top wall 50 extends between frame members 44 and 48. A frame member 52 is secured to and extends between frame members 42 and 46 at the upper ends of frame members 42 and 46. The horizontal spacing of frame members 34, 42 and frame members 38, 46 creates a vertically disposed pocket 54 therebetween which will be described in detail hereinafter.

A plurality of horizontally disposed shelves 56 are secured to frame members 34 and 38 and extend therebetween in a vertically spaced-apart manner, as seen in FIG. 1. An upstanding tool support box 58 having spaced-apart tool receiving openings 60 formed in the upper end thereof is secured to base 22 at the left front portion thereof (FIG. 1). An upstanding tool support box 62 having spaced-apart tool receiving openings 64 formed in the upper end thereof is secured to base 22 at the right front portion thereof (FIG. 1). As seen in FIG. 1, the front portion of base 22 has a plurality of spaced-apart tool receiving openings 66 formed therein. The numeral 68 refers to a vertically disposed peg board which is secured to frame members 42 and 46 at the rear side thereof for supporting tools thereon.

A pair of vertically disposed tool supporting drawers or panels 70 and 70' are horizontally slidably mounted on the frame 10 in the pocket 54. Panel 70 is selectively slidably mounted in the frame 12 so as to be movable from a stowed position in the pocket 54 to a tool presentation position horizontally laterally to the left of the frame 10. Panel 70' is selectively slidably mounted in the frame 12 so as to be moveable from a stowed position in the pocket forwardly of panel 70, when panel 70 is in its stowed position, to a tool presentation position horizontally laterally to the right of the frame 10.

Inasmuch as panels 70 and 70' are identical, only panel 70 will be described in detail with "'" designating identical structure on panel 70'. Panel 70 includes a frame 72 having a horizontally disposed upper frame member 74, a left side frame member 76, a lower frame member 78, and a right side frame member 80 which are joined together by welding or the like. A vertically disposed peg board 82 is positioned in the frame 72 and secured thereto with the peg board 82 having a front side 84 and a back side 86. The front side 84 of peg board 82 is configured to support tool hangers 88 and 90 thereon for supporting tools 92 and 94 thereon respectively. Frame member 74 is secured to a slide member 96 which is part of a conventional drawer slide assembly 98 which is secured to the upper end of frame 12 in pocket 54. Frame member 78 is secured to a slide member 100 which is a part of a conventional drawer slide assembly 102 which is secured to the lower end of frame 12. The drawer slide assemblies 98 and 102 permit the panel 70 and the tools thereon to be moved from its stowed position to the extension.

Figure 10:
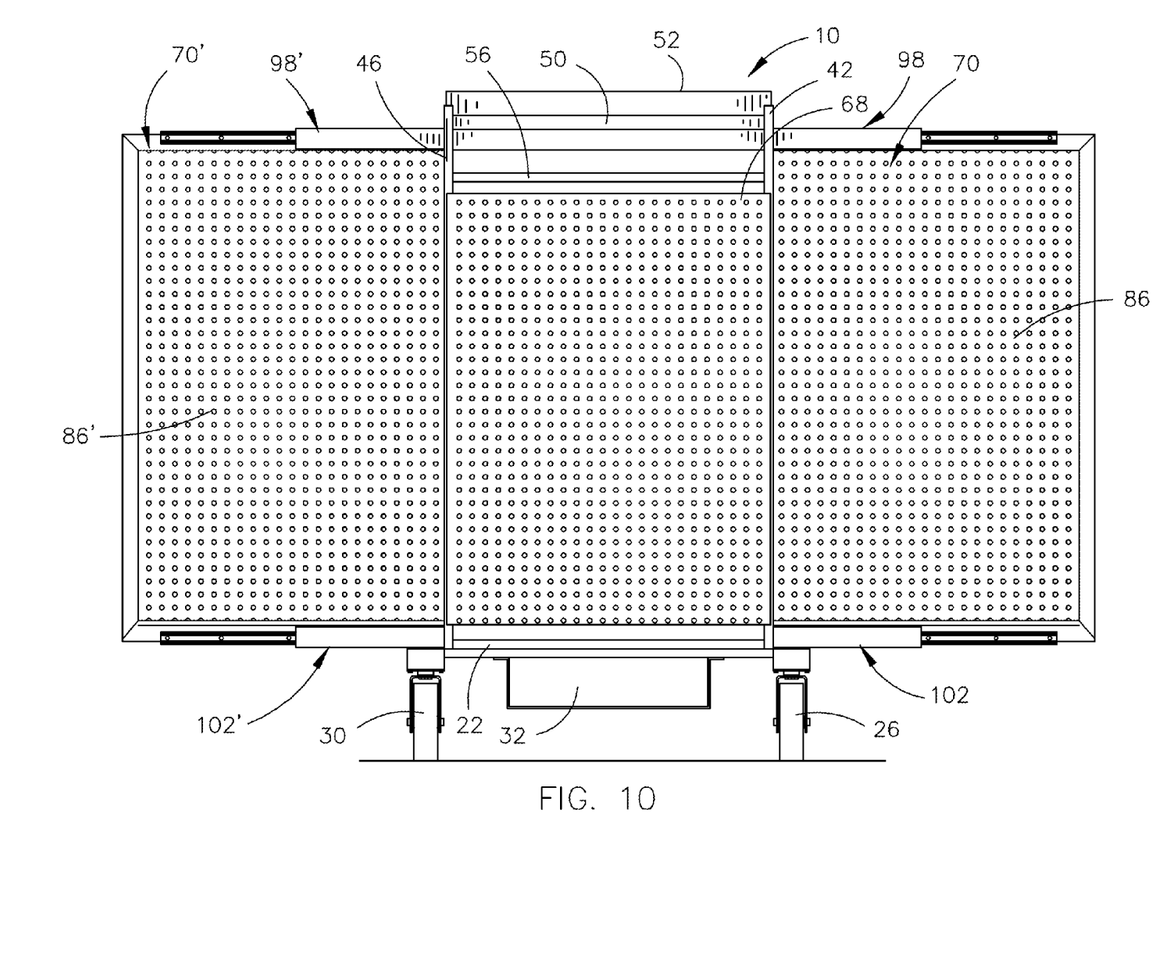
FIG. 10 is a view similar to FIG. 9 except that it is a rear view.
Figure 11:
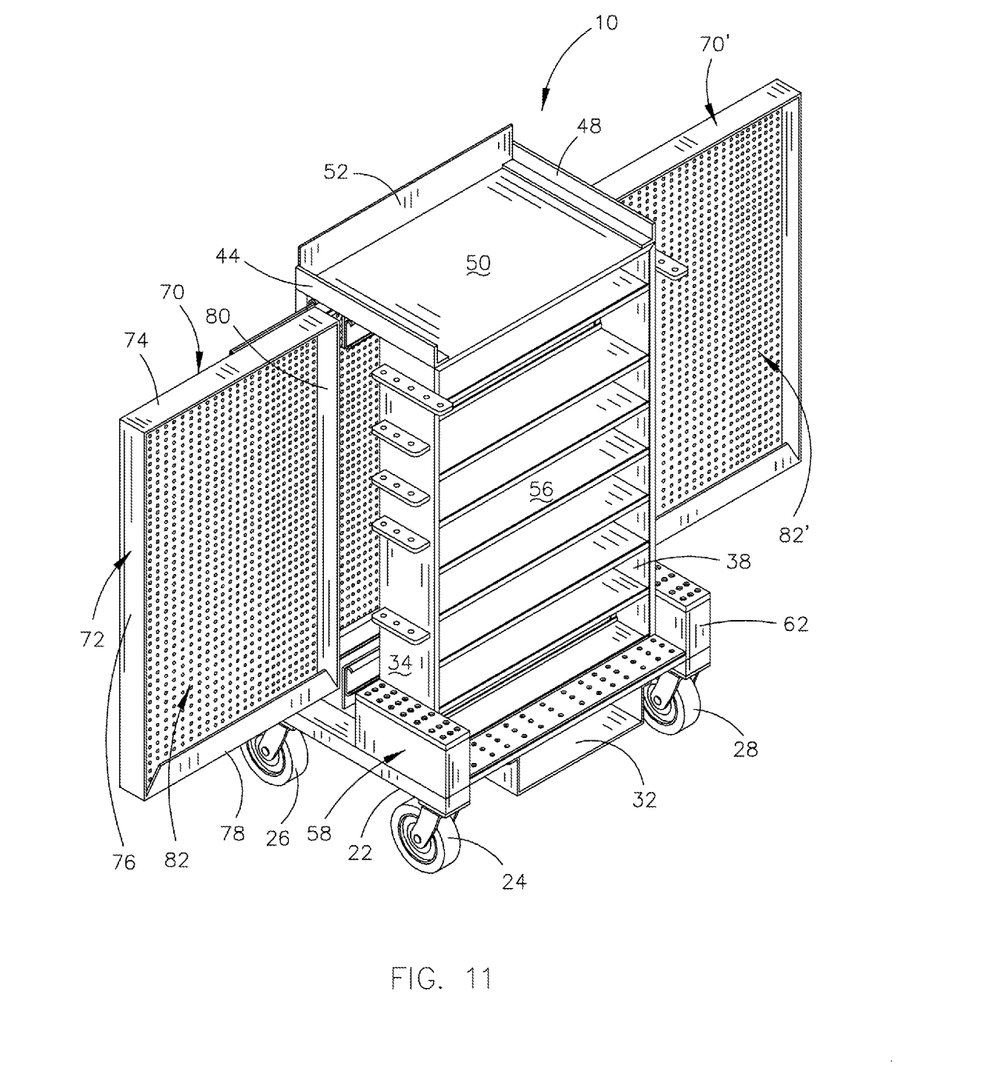
FIG. 11 is a perspective view illustrating both of the tool support panels in their tool presentation position.
Figure 12:
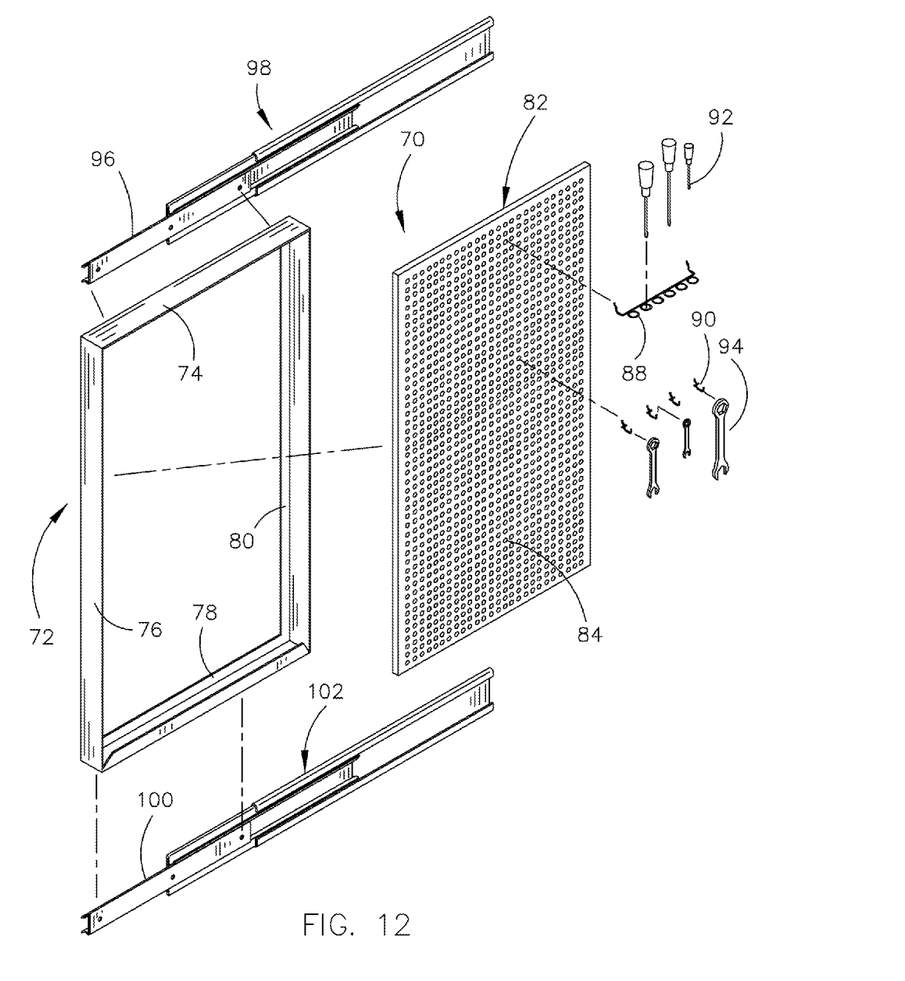
FIG. 12 is an exploded perspective view of one of the tool support panels.

In use, tools or other objects may be stored on or in the shelves 56, the tool support boxes 58 and 62, the openings 66, the tool supports 36 and 40, or on top of wall 50. Further, if peg board 68 is utilized, tools may be supported thereon. The weight of the frame means 12 and the tools or objects supported thereon provide a stable support for the panels 70 and 70' when they are in their tool presentation positions of FIGS. 10 and 11. The panels 70 and 70' will have tools supported on the front sides thereof.

When the tool box 10 is in its stowed position, the panels 70 and 70' are positioned within the pocket 54. The tool box 10 may be easily wheeled from location to location. When it is desired to use the tools supported on the tool box 10, the panels 70 and 70' may be moved to their tool presentation positions of FIGS. 10 and 11. The tools on the tool box 10 and the panels 70 and 70' are readily available to the mechanic or person using the tools.

The tool box 10 can support an enormous amount of tools, etc. thereon and therein. The tool box 10 is very stable, even when the panels 70 and 70' are in their tool presentation positions due to the weight of the frame 12 and the tools supported thereon.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A vertical tool box, comprising:

a vertically disposed wheeled frame means having a lower end, an upper end, a first side, a second side, a front side and a rear side;

said front and rear sides of said vertically disposed wheeled frame means being horizontally spaced-apart to define a vertically disposed pocket therebetween;

a vertically disposed first tool support panel having a lower end, an upper end, a first side edge, and a second side edge;

said first tool support panel being selectively horizontally slidably mounted on said wheeled frame means between stowed and tool presentation positions;

said first tool support panel, when in said stowed position, being centrally positioned in said pocket rearwardly of said front side of said wheeled frame means;

said first tool support panel, when in said tool presentation position, being positioned horizontally laterally of said first side of said wheeled frame means;

and a vertically disposed second tool support panel having a lower end, an upper end, a first side edge, and a second side edge;

said second tool support panel being selectively horizontally slidably mounted on said wheeled frame means between stowed and tool presentation positions;

said second tool support panel, when in said stowed position, being centrally positioned in said pocket forwardly of said first tool support panel when said first tool support panel is in its said stowed position;

said second tool support panel, when in said tool presentation position; being positioned horizontally laterally of said second side of said wheeled frame means;

said front side of said wheeled frame means having tool supporting fixtures thereon;

said tool supporting fixtures on said front side of said wheeled frame means being openly accessible when said first and second tool support panels are in said stowed and tool presentation positions.

2. The vertical tool box of claim 1 wherein said first tool support panel includes a peg board upon which tools may be positioned.

3. The vertical tool box of claim 2 wherein said second tool support panel includes a peg board upon which tools may be positioned.

4. The vertical tool box of claim 1 wherein said second tool support panel includes a peg board upon which tools may be positioned.

5. The vertical tool box of claim 1 wherein said tool supporting fixtures on said front side of said wheeled frame means comprises horizontally extending and vertically spaced-apart shelves.

6. The vertical tool box of claim 1 wherein a peg board is secured to said rear side of said wheeled frame means.

7. A vertical tool box, comprising:

a vertically disposed wheeled frame means having a lower end, an upper end, a first side, a second side, a front side and a rear side;

said vertically disposed wheeled frame means including a vertically disposed front frame section, having a front side and a rear side, and a vertically disposed rear frame section, having a front side and a rear side;

said vertically disposed front frame section including a vertically disposed first side frame member, having upper and lower ends, a vertically disposed second side frame member, having upper and lower ends, which is horizontally spaced from said first side frame member, a horizontally disposed lower frame member having a first end secured to said lower end of said first side frame member and a second end secured to said lower end of said second side frame member, a horizontally disposed upper frame member which has a first end secured to said upper end of said first side frame member and which has a second end secured to said upper end of said second side frame member;

said vertically disposed rear frame section including a vertically disposed first side frame member, having upper and lower ends, a vertically disposed second side frame member, having upper and lower ends, which is horizontally spaced from said first side frame member, a horizontally disposed lower frame member having a first end secured to said lower end of said first side frame member and a second end secured to said lower end of said second side frame member, a horizontally disposed upper frame member which has a first end secured to said upper end of said upper end of said first side frame member and which has a second end secured to said upper end of said second side frame member;

said front and rear frame sections being joined together to define a pocket between said front and rear frame sections;

a vertically disposed first tool support panel having a vertically disposed first side frame with upper and lower ends, a vertically disposed second side frame with upper and lower ends, a horizontally disposed lower frame secured to and extending between said lower ends of said first and second side frames, and a horizontally disposed upper frame secured to and extending between said upper ends of said first and second side frames thereof;

a vertically disposed peg board member secured to said first side frame, said second side frame, said lower frame and said upper frame of said vertically disposed first tool support panel;

said vertically disposed first tool support panel being horizontally selectively slidable with respect to said frame means between stowed and tool presentation positions;

said vertically disposed first tool support panel, when in said stowed position, being positioned within said pocket;

said vertically disposed first tool support panel, when in said tool presentation position, extending horizontally laterally from said first side of said frame means;

a vertically disposed second tool support panel having a vertically disposed first side frame with upper and lower ends, a vertically disposed second side frame with upper and lower ends, a horizontally disposed lower frame secured to and extending between said lower ends of said first and second side frames, and a horizontally disposed upper frame secured to and extending between said upper ends of said first and second side frames a vertically disposed peg board member secured to said first side frame, said second side frame, said lower frame and said upper frame of said vertically disposed second tool support panel;

said vertically disposed second tool support panel being horizontally selectively slidable with respect to said frame means between stowed and tool presentation positions;

said vertically disposed second tool support panel, when in said stowed position, being positioned within said pocket;

said vertically disposed second tool support panel, when in said tool presentation position, extending horizontally laterally from said second side of said frame means;

each of said peg boards being configured to support various tools thereon;

said front side of said front frame section having tool supporting fixtures thereon;

said tool supporting fixtures on said front side of said front frame section being openly accessible when said first and second tool support panels are in said stowed and tool presentation positions.

8. The vertical tool box of claim 7 wherein a plurality of horizontally extending and vertically spaced-apart tool support shelves are secured to said first and second side frame members of said front frame section.

9. The vertical tool box of claim 7 wherein a tool support peg board is secured to said back side of said rear frame section.

10. A vertical tool box, comprising:

a vertically disposed wheeled frame means having a lower end, an upper end, a first side, a second side, a front side and a rear side;

said vertically disposed wheeled frame means including a vertically disposed front frame section, having a front side and a rear side, and a vertically disposed rear frame section, having a front side and a rear side;

said vertically disposed front frame section including a vertically disposed first side frame member, having upper and lower ends, a vertically disposed second side frame member, having upper and lower ends, which is horizontally spaced from said first side frame member, a horizontally disposed lower frame member having a first end secured to said lower end of said first side frame member and a second end secured to said lower end of said second side frame member, a horizontally disposed upper frame member which has a first end secured to said upper end of said first side frame member and which has a second end secured to said upper end of said second side frame member;

said vertically disposed rear frame section including a vertically disposed first side frame member, having upper and lower ends, a vertically disposed second side frame member, having upper and lower ends, which is horizontally spaced from said first side frame member, a horizontally disposed lower frame member having a first end secured to said lower end of said first side frame member and a second end secured to said lower end of said second side frame member, a horizontally disposed upper frame member which has a first end secured to said upper end of said upper end of said first side frame member and which has a second end secured to said upper end of said second side frame member;

said front and rear frame sections being joined together to define a pocket between said front and rear frame sections;

a vertically disposed first tool support panel including:
  (a) a vertically disposed first side frame member having an upper end, a lower end, a front end and a rear end;
  (b) a vertically disposed second side frame member having an upper end, a lower end, a front end and a rear end;
  (c) a horizontally disposed lower frame member having a first end, a second end, a front end and a rear end;
  (d) a horizontally disposed upper frame member having a first end, a second end, a front end and a back end;
  (e) said first end of said lower frame member of said first tool support panel being secured to said lower end of said first side frame member of said first tool support panel;
  (f) said second end of said lower frame member of said first tool support panel being secured to said lower end of said second side frame member of said first tool support panel;
  (g) said first end of said upper frame member of said first tool support panel being secured to said upper end of said first side frame member of said first tool support panel;
  (h) said second end of said upper frame member of said first tool support panel being secured to said upper end of said second side frame member of said first tool support panel;
  (i) a first vertically disposed peg board member having an upper end, a lower end, a first side edge, a second side edge, a front side and a rear side;
  (j) said first peg board member being positioned within and secured to said first side frame member, said second side frame member, said lower frame member and said upper frame member of said first tool support panel adjacent said rear ends thereof;

said vertically disposed first tool support panel being horizontally selectively slidable with respect to said frame wheeled means between stowed and tool presentation positions;

said vertically disposed first tool support panel, when in said stowed position, being positioned within said pocket;

said vertically disposed first tool support panel, when in said tool presentation position, extending horizontally laterally from said first side of said wheeled frame means;

a vertically disposed second tool support panel including:
  (a) a vertically disposed first side frame member having an upper end, a lower end, a front end and a rear end;
  (b) a vertically disposed second side frame member having an upper end, a lower end, a first end and a rear end;
  (c) a horizontally disposed lower frame member having a first end, a second end, a front end and a rear end;
  (d) a horizontally disposed upper frame member having a first end, a second end, a front end and a back end;
  (e) said first end of said lower frame member of said second tool support panel being secured to said lower end of said first side frame member of said second tool support panel;
  (f) said second end of said lower frame member of said second tool support panel being secured to said lower end of said second side frame member of said second tool support panel;
  (g) said first end of said upper frame member of said second tool support panel being secured to said upper end of said first side frame member of said second tool support panel;
  (h) said second end of said upper frame member of said second tool support panel being secured to said upper end of said second side frame member of said second tool support panel;
  (i) a second vertically disposed peg board member having an upper end, a lower end, a first side edge, a second side edge, a front side and a rear side;
  (j) said second peg board member being positioned within and secured to said first side frame member, said second side frame member, said lower frame member and said upper frame member of said second tool support panel adjacent said rear ends thereof;

said vertically disposed second tool panel being horizontally selectively slidable with respect to said wheeled frame means between stowed and tool presentation positions;

said vertically disposed second tool support panel, when in said stowed position, being positioned within said pocket;

said vertically disposed second tool support panel, when in said tool presentation position, extending horizontally laterally from said second side of said wheeled frame means;

each of said peg boards being configured to support various tools thereon;

said front side of said wheeled frame means having tool supporting fixtures thereon;

said tool supporting fixtures on said front side of said wheeled frame means being openly accessible when said first and second tool support panels are in said stowed and tool presentation positions.

11. The vertical tool box of claim 10 wherein a peg board is secured to said rear side of said rear frame section of said wheeled frame means.

* * * * *